(12) United States Patent
Bech et al.

(10) Patent No.: US 10,697,425 B2
(45) Date of Patent: Jun. 30, 2020

(54) WIND TURBINE BLADES

(71) Applicant: Vestas Wind Systems A/S, Aarhus N. (DK)

(72) Inventors: Anton Bech, Ringkøbing (DK); Steve Wardropper, New Milton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 89 days.

(21) Appl. No.: 15/747,491

(22) PCT Filed: Jul. 26, 2016

(86) PCT No.: PCT/DK2016/050257
§ 371 (c)(1),
(2) Date: Jan. 25, 2018

(87) PCT Pub. No.: WO2017/016566
PCT Pub. Date: Feb. 2, 2017

(65) Prior Publication Data
US 2018/0216602 A1    Aug. 2, 2018

(30) Foreign Application Priority Data

Jul. 28, 2015 (DK) ................................. 2015 70492

(51) Int. Cl.
*F03D 1/06* (2006.01)
*F16F 1/373* (2006.01)
(Continued)

(52) U.S. Cl.
CPC .......... *F03D 1/0675* (2013.01); *F16F 1/3732* (2013.01); *F16F 3/0876* (2013.01);
(Continued)

(58) Field of Classification Search
CPC ..... F03D 1/0675; F16F 1/3732; F16F 3/0876; Y02P 70/523; B29C 66/54
See application file for complete search history.

(56) References Cited

U.S. PATENT DOCUMENTS 7,980,826 B2 *   7/2011   Hancock ............ B29D 99/0028
                                                  416/223 R
8,186,692 B2 *   5/2012   Durocher ............ F16J 15/0887
                                                  277/631
(Continued)

FOREIGN PATENT DOCUMENTS

CN      102817771 A     12/2012
WO      2008104174 A2   9/2008
(Continued)

OTHER PUBLICATIONS

European Patent Office, International Search Report and Written Opinion in PCT/DK2016/050257, dated Oct. 24, 2016.
(Continued)

*Primary Examiner* — Christopher Verdier
*Assistant Examiner* — Jesse M Prager
(74) *Attorney, Agent, or Firm* — Wood Herron & Evans LLP

(57) ABSTRACT

A shear web for a wind turbine blade is described. The shear web comprises a panel and a web head. A longitudinal edge of the panel is received within a slot defined in the web head. A plurality of discrete spring features are attached to the longitudinal edge of the panel. The spring features are mutually spaced apart at intervals along the length of the longitudinal edge. The spring features compress against a base of the slot when the longitudinal edge region of the panel is inserted into the slot.

12 Claims, 5 Drawing Sheets

(51) Int. Cl.
*F16F 3/087* (2006.01)
*B29C 65/48* (2006.01)
*B29C 65/78* (2006.01)
*B29C 65/00* (2006.01)
*B29L 31/08* (2006.01)

(52) U.S. Cl.
CPC .......... *B29C 65/48* (2013.01); *B29C 65/7826* (2013.01); *B29C 66/54* (2013.01); *B29L 2031/085* (2013.01); *F05B 2230/60* (2013.01); *F05B 2230/604* (2013.01); *F05B 2240/302* (2013.01); *F16F 2234/02* (2013.01); *Y02E 10/721* (2013.01); *Y02P 70/523* (2015.11)

(56) References Cited

U.S. PATENT DOCUMENTS

| | | | |
|---|---|---|---|
| 10,399,275 | B2* | 9/2019 | Nielsen ................ B29C 66/721 |
| 2006/0113451 | A1 | 6/2006 | Kilwin et al. |
| 2006/0115320 | A1 | 6/2006 | Wood et al. |
| 2010/0003141 | A1 | 1/2010 | Hancock |
| 2015/0152838 | A1 | 6/2015 | Merzhaeuser et al. |

FOREIGN PATENT DOCUMENTS

| | | |
|---|---|---|
| WO | 2013086667 A1 | 6/2013 |
| WO | 2014086703 A1 | 6/2014 |

OTHER PUBLICATIONS

Danish Patent and Trademark Office, Search and Examination Report in PA 2015 70492, dated Feb. 26, 2016.
China National Intellectual Property Administration, First Notification of Office Action in CN Application No. 20168004957.1, dated Dec. 29, 2018.
China National Intellectual Property Administration, F2nd Notification of Office Action in CN Application No. 20168004957.1, dated Aug. 12, 2019.

* cited by examiner

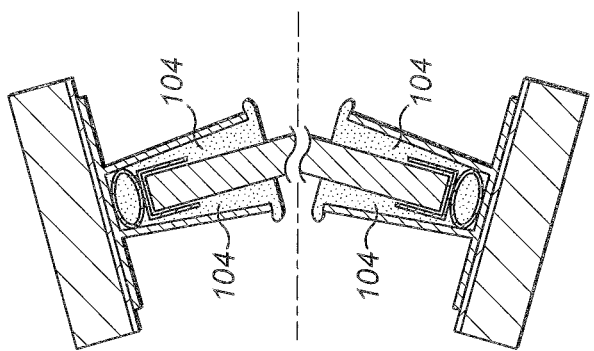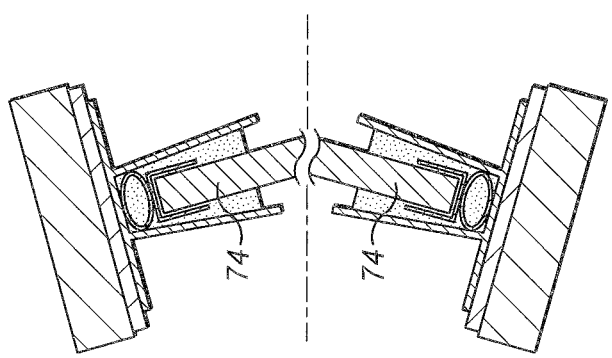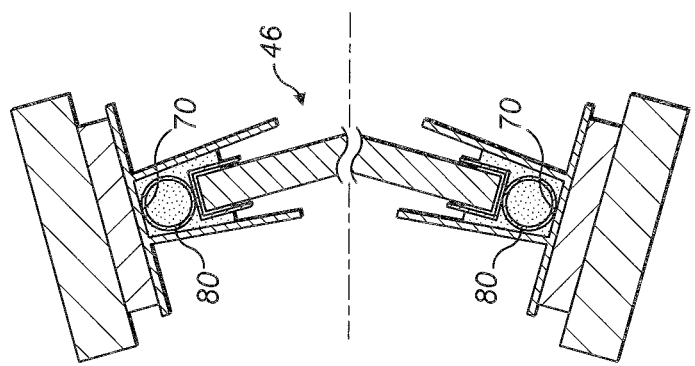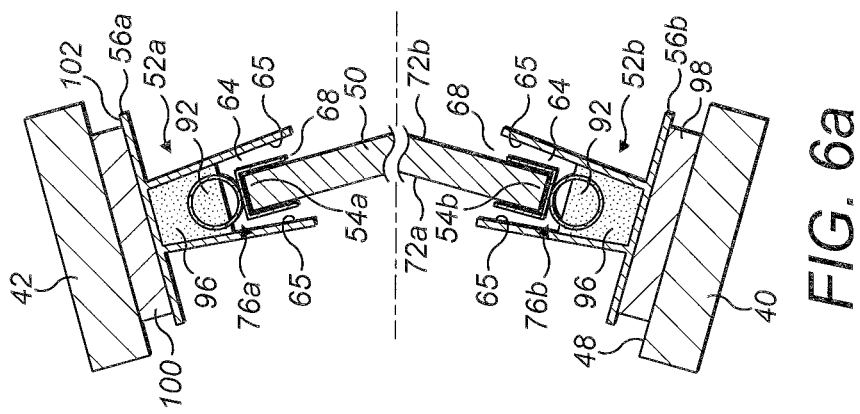

WIND TURBINE BLADES

TECHNICAL FIELD

The present invention relates generally to wind turbine blades and their manufacture, and more specifically to an improved shear web for a wind turbine blade and a method of manufacturing a wind turbine blade comprising the improved shear web.

BACKGROUND

Modern wind turbine blades are typically constructed from two half shells: a windward shell and a leeward shell. The half shells are formed in separate mould halves of a mould assembly. After forming the half shells in their respective mould halves, adhesive is applied along leading and trailing edges of one or both half shells. One mould half is then lifted, turned and positioned on top of the other mould half. This is known as closing the mould, and results in the two half shells being positioned in contact along their respective leading and trailing edges. The adhesive between the two half shells is then cured, which results in the half shells being firmly bonded together to form the complete blade.

The wind turbine blade typically includes one or more shear webs located inside the blade and bonded between inner surfaces of the windward and leeward half shells. The shear webs are longitudinal structures, which when viewed in cross-section are substantially I-shaped or C-shaped and comprise a web having first and second flanges at its respective ends. The flanges are bonded respectively to the inner surfaces of the respective half shells and the web thereby forms a bridge between the half shells.

Prior to closing the mould to bond the half shells together, a longitudinal strip of adhesive is applied to the inner surface of one of the half shells and the shear web is positioned on top of the adhesive. The shear web is typically arranged vertically such that a lowermost flange of the shear web sits on top of the adhesive. A further strip of adhesive is applied along the uppermost flange of the shear web. If the blade has multiple shear webs then this process is repeated for each shear web. The mould is then closed. The adhesive between the flanges of the shear web(s) and the respective inner surfaces of the blade shells is compressed when the mould is closed and cures at the same time as the adhesive between the half shells.

It is important to ensure sufficient squeezing of adhesive between the shear webs and the respective half shells during mould closure in order to form consistent bond lines between the flanges of the shear webs and the inner surfaces of the respective half shells. One way of achieving this is described in the applicant's prior PCT application WO2008/104174, whereby the shear web incorporates a resilient member arranged to compress during mould closure and subsequently expand during curing of the adhesive. This results in the flanges of the shear web being forced towards the respective inner surfaces of the half shells such that they exert a compressive force on the adhesive during curing.

The shear web described in WO2008/104174 is illustrated in FIG. 1. Referring to FIG. 1, the shear web 10 is formed in multiple parts and comprises a web panel 12 and a web head 14 fitted over an upper longitudinal edge 16 of the panel 12. The web panel 12 is substantially L-shaped and defines a lower flange 18 of the shear web 10 for bonding to an inner surface of a first half shell of the blade. The web head 14 is substantially T-shaped in cross-section and defines an upper flange 20 for bonding to an inner surface of the second half shell of the blade.

The T-shaped web head 14 includes a longitudinal slot 22. A strip of foam 24 is provided at the base of the slot 22, and the slot 22 is filled with adhesive. The upper edge 16 of the panel 12 is then inserted into the slot 22 such that the strip of foam 24 is located between the upper edge 16 of the panel 12 and the base of the slot 22. When the mould is closed to bond the shell halves together, the strip of foam 24 is compressed initially and then subsequently expands slightly to force the web head 14 towards the inner surface of the half shell. Accordingly the foam 24 functions as a spring.

A number of drawbacks have been identified with the above solution. In particular, the strip of foam 24 does not perform particularly effectively as a spring, and hence squeezing of adhesive between the flanges 18, 20 of the shear web 10 and the inner surface of the blade shell is still sub optimal. Further, the strip of foam 24 occupies a critical region at the base of the slot 22 in the web head 14. As the strip of foam 24 extends along the entire length of the web head 14, it prevents adhesive from accumulating at the base of the slot 22. Accordingly, an adhesive void is effectively present at the base of the slot 22, which prevents the longitudinal edge 16 of the panel 12 bonding to the web head 14 at the base of the slot 22.

Another problem identified with the above solution in practice is that it can be difficult to ensure that the web panel 12 is inserted centrally into the slot 22 in the web head 14. Once the mould is closed, it is then not possible to inspect the position of the panel 12 inside the web head 14. If the web panel 12 is not inserted centrally in the slot 22, then it may wipe away adhesive from one side of the slot 22 during insertion. This can result in a sub-optimal bond forming between the web panel 12 and the web head 14 because the panel 12 may only then be bonded on one side of the slot 22.

The present invention aims to overcome one or all of the above problems.

SUMMARY OF THE INVENTION

According to the present invention there is provided a shear web for a wind turbine blade, the shear web comprising: a longitudinally-extending panel having a longitudinal edge region defining a longitudinal edge of the panel; a longitudinally-extending web head comprising a longitudinal surface for bonding to an inner surface of the wind turbine blade shell, and first and second longitudinally-extending sidewalls arranged transverse to the longitudinal surface, the sidewalls being mutually spaced apart to define a longitudinally-extending slot therebetween for receiving the longitudinal edge region of the panel; and a plurality of discrete spring features attached to the longitudinal edge of the panel, the spring features being mutually spaced apart at intervals along the length of the longitudinal edge and configured to compress against a base of the slot when the longitudinal edge region of the panel is inserted into the slot.

The spring features of the present invention are resilient and regain their original shape (or at least partially regain their original shape) after compression. The spring features have been found to be particularly effective and result in optimal compression of adhesive in the bond line between the web head and a blade shell during manufacture of a wind turbine.

The shear web may be assembled by inserting the longitudinal edge region of the panel within the slot of the web head. The slot may be filled, at least partially, with a suitable adhesive. The adhesive serves to bond the longitudinal edge of the panel to the web head.

The provision of spring features on the longitudinal edge of the panel in accordance with the present invention means that it is no longer necessary to provide a strip of foam in the base of the slot in the web head. Accordingly, the base of the slot remains available for adhesive to accumulate in. The present invention therefore substantially avoids adhesive voids occurring between the panel and the web head at the base of the slot when the panel is bonded to the web head.

In preferred embodiments the spring features are arranged at intervals of approximately two to four per metre along the length of the longitudinal edge of the panel. However, any other suitable spacing may be used. The provision of spring features as discrete elements that are mutually spaced apart at intervals along the length of the longitudinal edge of the panel is particularly advantageous because it allows more space for adhesive to accumulate between the edge of the panel and the base of the slot in regions between the spring features, since there is nothing between the edge of the panel and the base of the slot in these regions. This accordingly improves the bonding between the panel and the web head and prevents adhesive voids between the panel and the base of the slot in these regions. The provision of discrete spring features also minimises costs since it is not required for the spring features to extend along the entire length of the panel.

In preferred embodiments, the spring features each comprise a bracket shaped to fit over the longitudinal edge of the panel and a spring depending from the bracket. The bracket provides a convenient means of attaching the spring feature to the longitudinal edge of the panel. The spring features are preferably configured to form a push fit with the longitudinal edge of the panel. This allows the spring features conveniently to be pushed onto the longitudinal edge of the panel by hand and retained on the longitudinal edge without requiring adhesive or mechanical fasteners. This speeds up production of the wind turbine blade.

The spring features are preferably formed of a plastics material such as polyamide or polyester. The spring features may conveniently be formed by injection moulding or plastics extrusion, for example. In preferred embodiments the spring is integrally formed with the bracket. This simplifies the manufacturing process as the spring elements may be formed as a single piece. However, in other embodiments the spring and bracket could be formed separately and then joined together.

The springs of the spring features are preferably substantially tubular. Tubular shapes can be formed easily by injection moulding or extrusion. The tubular shape also provides a particularly effective spring, since it is compressible and resilient and therefore readily springs back into shape when compressed. In preferred embodiments the spring is substantially circular in cross-section. Circular profiles are highly resilient and hence have been found to provide a particularly effective spring.

The spring features preferably each define one or more open-ended channels extending longitudinally substantially parallel to the longitudinal edge of the panel. These channels advantageously allow adhesive in the slot to redistribute along the length of the slot without being impeded by the spring features. The channels may have any suitable form and may be provided by any suitable means. For example, the channels could be drilled channels or the channels could be integrally-formed with the spring elements, for example using a suitably-shaped injection mould tool or extrusion die configured to define the channels. A tubular spring provides further advantages in this respect because a suitable channel is inherently defined through the tubular spring.

The slot in the web head is preferably wider in cross section than the longitudinal edge region of the panel. This allows space for adhesive to accumulate on both sides of the panel between the longitudinal edge region and the respective sidewalls of the slot. However, as discussed by way of background, it can be difficult to ensure that the panel is inserted centrally into the slot, and if the panel is not substantially central then there is a risk that adhesive is scraped from one side of the slot resulting in the panel being bonded only on one side to the web head.

To overcome this problem, the spring features preferably protrude beyond the first and/or second sides of the longitudinal edge region of the panel. The spring features are preferably configured to abut the first and/or second sidewalls of the slot. This advantageously ensures that the longitudinal edge region of the panel is suitably spaced from the first and/or second sidewalls of the slot when the panel is inserted into the web head. This prevents the panel from scraping adhesive from one side of the slot and thus ensures that the panel is bonded on both sides to the web head to form a double lap joint with the web head.

The spring features are preferably configured to align the longitudinal edge region of the panel substantially centrally in the slot with respect to the first and second sidewalls. This results in bonds of substantially equal thickness between the panel and the web head on both sides of the panel.

Accordingly, as well as providing biasing means for ensuring suitable compression of adhesive in the bond lines between the web heads and the blade shells, the spring features may also serve to align the panels in the slots of the web heads, as described above. Accordingly, double lap joints between the web heads and the panel can be formed reliably.

The web head preferably comprises a flange defining the longitudinal surface for bonding to the inner surface of the wind turbine blade shell. The first and second sidewalls are preferably arranged transversely to the flange. The sidewalls are preferably integrally formed with the flange. In preferred embodiments, the web head is a fibre-reinforced composite formed by pultrusion.

The present invention includes a wind turbine blade comprising the shear web described above. The present invention also encompasses a wind turbine comprising such a blade.

The invention also provides a method of making at least part of a wind turbine blade. The method comprises the following steps in any suitable order: providing a first half shell of the blade; providing a shear web comprising: a longitudinally-extending web head having a longitudinal surface and first and second sidewalls arranged transversely to the longitudinal surface, the sidewalls being mutually spaced apart to define a longitudinally-extending slot therebetween; and a longitudinally-extending panel having a longitudinal edge region defining a longitudinal edge of the panel; providing a plurality of discrete spring features spaced at intervals along the longitudinal edge of the panel; providing adhesive in the slot of the web head; inserting the longitudinal edge region of the panel into the slot of the web head; arranging the web head against an inner surface of the first half shell; providing adhesive between the longitudinal surface of the web head and the inner surface of the first half shell; forcing the panel towards the web head such that the longitudinal edge region of the panel is inserted further into the slot and the spring features are compressed against a base of the slot.

The method preferably comprises configuring the spring features to abut the first and second sidewalls of the slot when the longitudinal edge region of the panel is inserted into the slot such that the longitudinal edge region of the panel is spaced apart from the first and second sidewalls of the slot.

Optional features described in relation to the invention when expressed in terms of an apparatus apply equally to the present invention when expressed in terms of a method, and vice versa. Repetition of features has been avoided purely for reasons of conciseness.

Figure 2:
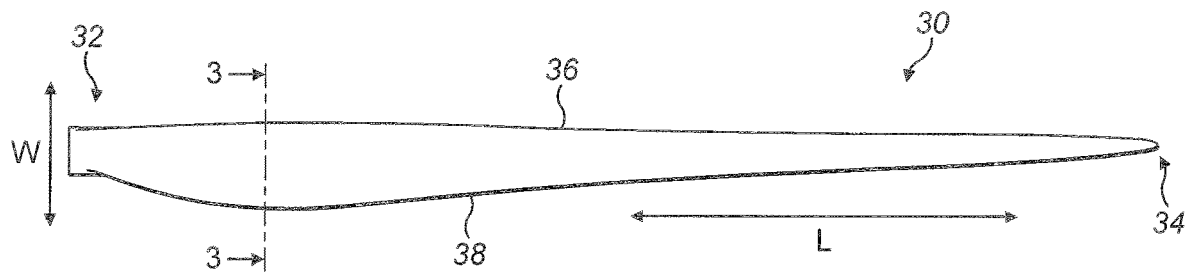
Figure 3A:
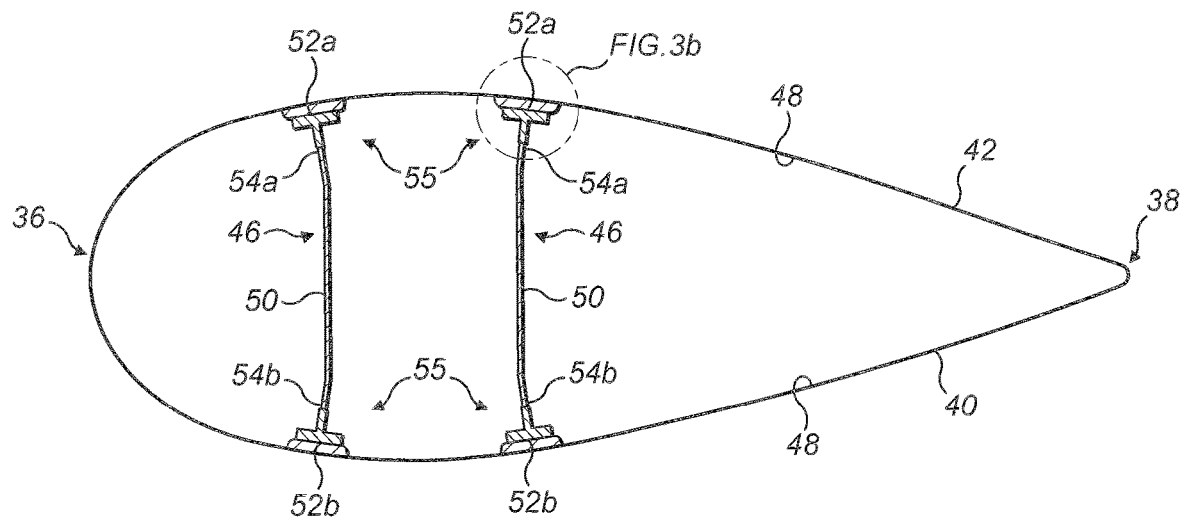
Figure 3B:
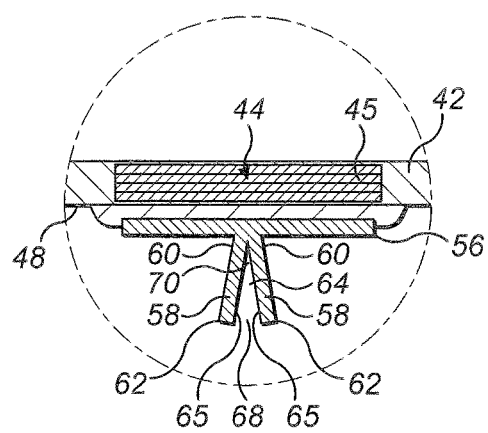
Figure 4:
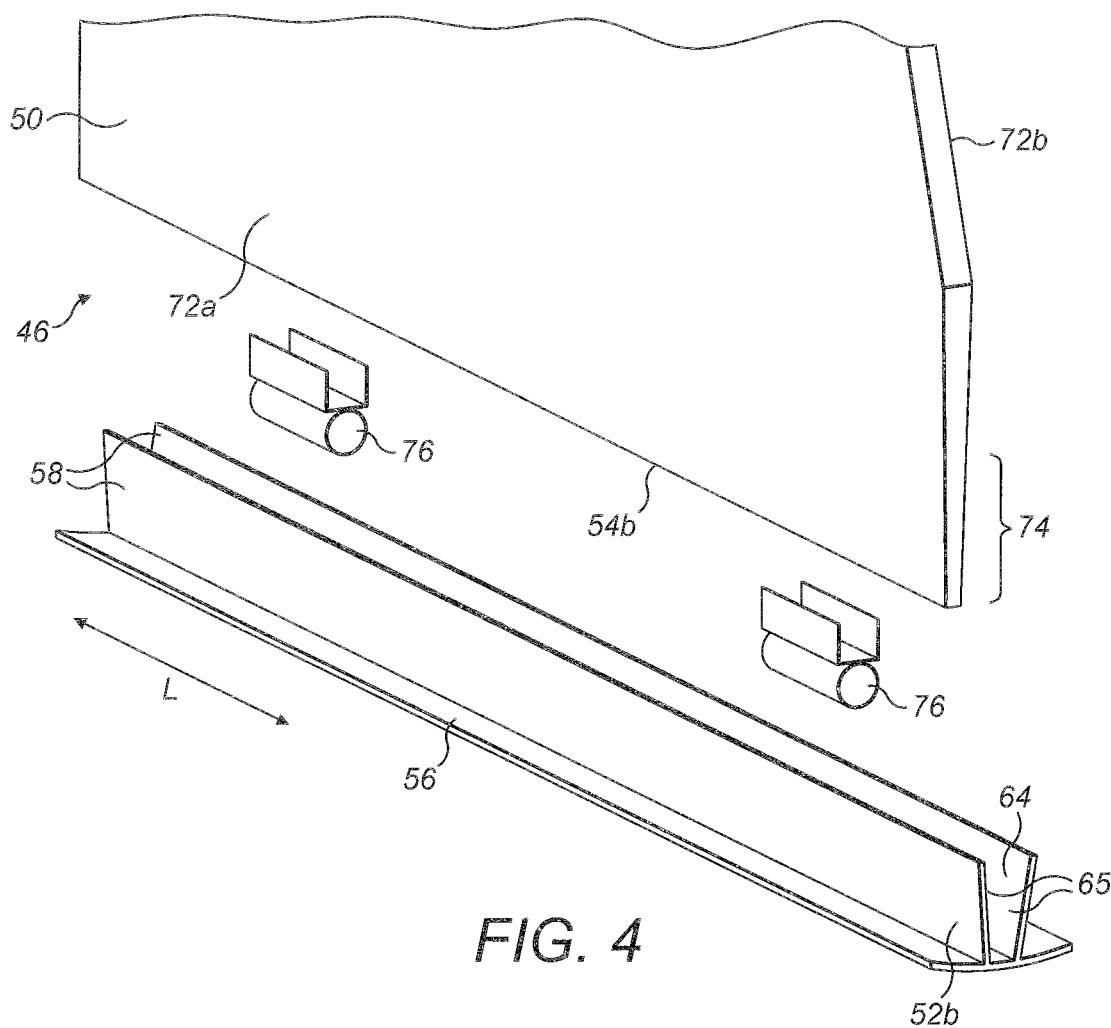
Figure 5:
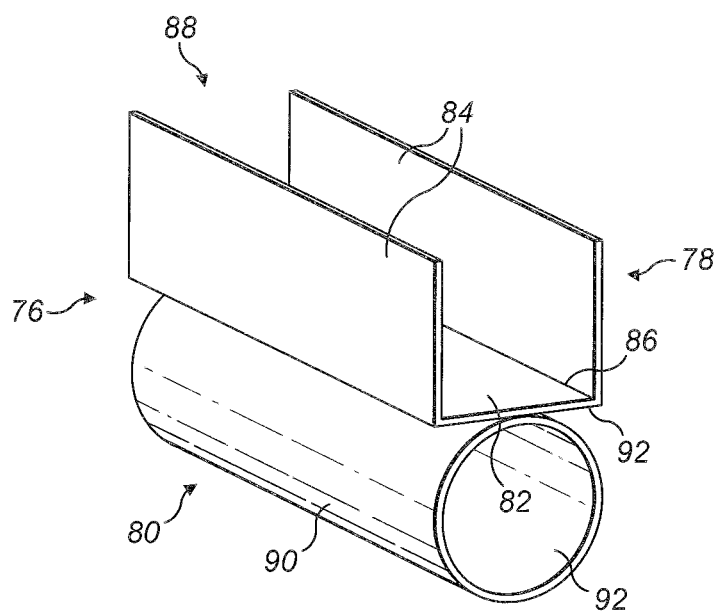
Figure 7A:
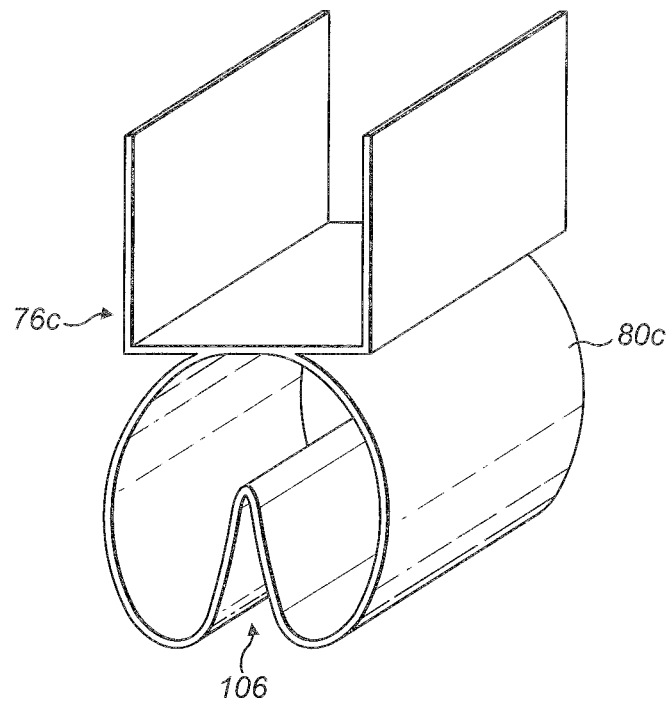
Figure 7B:
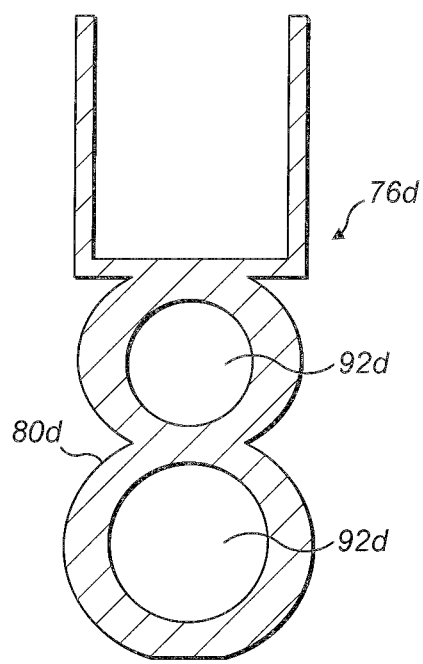
Figure 7C:
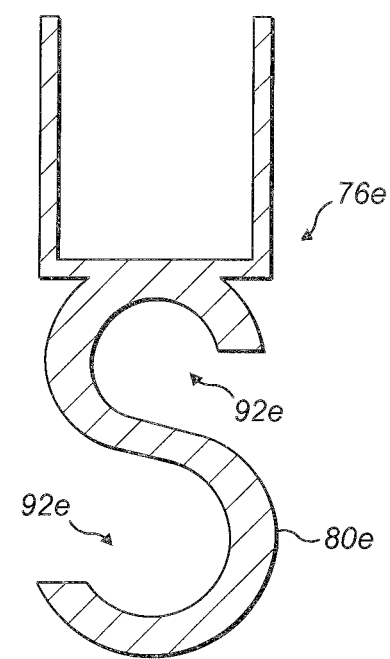

Embodiments of the present invention will now be described with reference to the remaining figures, in which:

FIG. 2 is a plan view of a wind turbine blade according to the present invention;

FIG. 3a is a cross-section through the wind turbine blade taken along the line 3-3 in FIG. 2, and shows a pair of shear webs according to the present invention located inside the blade;

FIG. 3b is an enlarged view of part of FIG. 3a showing a spar cap embedded in the shell of the wind turbine blade;

FIG. 4 is an exploded perspective view of a panel and a web head of one of the shear webs of FIG. 3a, and shows a plurality of spring features for attaching to a longitudinal edge of the panel;

FIG. 5 is an enlarged view of a spring features;

FIGS. 6a-6d are a series of schematic cross-sections through the shear web illustrating the process of bonding the web panel to the web heads during closing of the mould and show compression of the spring features; and FIGS. 7a-7c illustrate suitable alternative configurations of the spring features.

DETAILED DESCRIPTION

FIG. 2 shows a wind turbine blade 30 according to the present invention. The wind turbine blade 30 extends in a longitudinal/spanwise direction L between a root end 32 and a tip end 34, and extends in a widthwise/chordwise direction W between a leading edge 36 and a trailing edge 38.

Referring now to FIG. 3a, which is a transverse cross-section through the blade 30 taken along the line 3-3 in FIG. 2, the wind turbine blade 30 comprises a windward half shell 40 and a leeward half shell 42, which are bonded together along the leading and trailing edges 36, 38 of the blade 30. As described by way of introduction, each half shell 40, 42 is formed in a respective mould half of a mould assembly prior to the half shells being bonded together to form the complete blade 30. The shells 40, 42 are formed primarily from GRP, but may include other structural materials in regions of the shells 40, 42, for example core materials such as foam panels.

Referring to the enlarged view of FIG. 3b, spar caps 44 are integrated within the shells 40, 42. The spar caps 44 are formed from stacks of pultruded strips 45 of carbon-fibre reinforced plastic (CFRP). The spar caps 44 extend along the majority of the blade 30, from the root 32 to near the tip 34.

Referring again to FIG. 3a, shear webs 46 are provided inside the blade 30, and are bonded by means of adhesive to inner surfaces 48 of the windward and leeward half shells 40, 42 between opposed spar caps 44. The shear webs 46 therefore bridge the opposed spar caps 44 of the windward and leeward shells 40, 42. In this example, the blade 30 includes first and second shear webs 46. The shear webs 46 extend longitudinally in the spanwise direction of the blade 30, and run along the majority of the length of the blade 30 from the root 32 of the blade 30 to near the tip 34 of the blade 30.

The shear webs 46 are substantially I-shaped in cross-section, and each shear web 46 comprises a longitudinally-extending web panel 50 and first and second longitudinally-extending web heads 52a, 52b. The first and second web heads 52a, 52b are bonded respectively to first and second longitudinal edges 54a, 54b of the web panel 50. In the orientation of the blade shown in FIG. 3a, the shear webs 46 are substantially vertical and accordingly for ease of understanding the first and second longitudinal edges 54a, 54b are hereafter referred to as 'upper' and 'lower' longitudinal edges, and the first and second web heads 52a, 52b are hereafter referred to as 'upper' and 'lower' web heads.

The web panel 50 has a sandwich construction and comprises a foam core disposed between first and second GRP skins. To accommodate the curvature of the inner surfaces 48 of the blade 30, the web panel 50 in this example includes kinks 55.

The web-heads 52a, 52b are pultruded parts formed from GRP and are generally T-shaped in cross-section. As shown best in FIG. 3b, each web head 52a, 52b comprises a flange 56 for bonding to the inner surface 48 of the blade shell 40, 42, and a pair of legs 58 that extend transversely from the flange 56. Each leg 58 extends from a proximal end 60 integrated with the flange to a distal end 62 spaced apart from the flange 56. The legs 58 splay outwards from the flange 56 to form a longitudinal slot 64 in between for receiving a longitudinal edge 54a, 54b of the web panel 50.

The slot 64 comprises first and second opposed sidewalls 65 defined respectively by the first and second legs 58. The slot 64 further comprises a mouth 68 defined between the respective distal ends 62 of the legs 58 and a base 70 defined between the respective proximal ends 60 of the legs 58. The distance between the legs 58 defines a width of the slot 64. Due to the splayed legs 58, the slot 64 tapers in width moving from the mouth 68 to the base 70. Expressed in other terms, the slot 64 becomes narrower with increasing depth.

As will be explained in further detail later with reference to FIGS. 6a-6d, the upper and lower longitudinal edges 54a, 54b of the web panel 50 are bonded inside the respective slots 64 of the upper and lower web heads 52a, 52b. It should be noted that the web panel 50 has been omitted from FIG. 3b for ease of illustration.

FIG. 4 shows a perspective view of a lower part of a web panel 50 and a lower web head 52b of one of the shear webs 46 of FIG. 3a. FIG. 4 only shows a relatively small longitudinal section of the shear web 46 (approximately 1 metre), whereas in practice the shear web 46 may have a length in excess of 80 metres when incorporated in the blades of current large utility-scale wind turbines.

Referring to FIG. 4, the web panel 50 has first and second opposed major surfaces 72a, 72b defined by the first and second skins of the web panel 50. Only the first major surface 72a is visible in the perspective view of FIG. 4. The distance between the first and second major surfaces 72a, 72b defines the thickness of the panel 50. It can be seen from FIG. 4 that the thickness of the panel 50 decreases moving from the lower kink towards the lower longitudinal edge 54b of the panel 50. In other words, the panel 50 tapers in thickness towards the lower longitudinal edge 54b.

The panel 50 therefore has a tapered lower longitudinal edge region 74, which defines the lower longitudinal edge 54b of the panel 50. As will be described later with reference to FIGS. 6a-6d, the tapered lower longitudinal edge region 74 of the panel 50 is received within the slot 64 in the lower web head 52b. The thickness of the lower longitudinal edge region 74 of the panel is less than the width of the slot 64 in the web head 52b to allow space for adhesive between the sides 72a, 72b of the panel 50 and the legs 58 of the web head 52b. Whilst not shown in FIG. 4, the panel 50 has a similarly tapered upper longitudinal edge region which is received within the slot 64 of the corresponding upper web head 52a.

Referring still to FIG. 4, a plurality of spring features 76 are provided on the lower longitudinal edge 54b of the web panel 50. The spring features 76 are mutually-spaced at regular intervals along the length of the longitudinal edge 54b. In this example, the spring features 76 are spaced at intervals of approximately two to four per metre. Whilst not shown in FIG. 4, a plurality of spring features are also provided on the upper longitudinal edge 54b of the web panel 50 (this can be seen in FIGS. 6a-6d).

Each spring feature 76 has a length of approximately five centimetres (cm) in the longitudinal direction L, parallel to the longitudinal edges 54a, 54b of the web panel 50, and a width of approximately 1.5 cm perpendicular to its length.

Referring also to FIG. 5, which shows a spring feature 76 in isolation, the spring feature 76 comprises a bracket 78 and a spring 80. The spring features 76 are injection-moulded or extruded thermoplastic parts, with the bracket 76 and spring 80 being integrally formed.

The bracket 76 is substantially U-shaped in cross-section and comprises a generally flat base 82 with first and second sides 84 extending generally perpendicular to the base 82. In the orientation of the spring feature 76 shown in FIG. 5, the sides 84 of the bracket 76 extend upwardly from a first, or upper side 86 of the base 82. The first and second sides 84 are mutually spaced apart to define a longitudinal recess 88 therebetween.

The spring 80 comprises a hollow tube 90 of circular cross-section. The spring 80 depends from the bracket 78, and in the orientation of the spring feature 76 shown in FIG. 5, the spring 80 depends downwardly from a second, or lower side 92 of the base 82 of the bracket 78. The spring 80 comprises an open-ended longitudinal channel 94 defined by the hollow tube 90.

The first and second sides 84 of the bracket 78 of the spring feature 76 are spaced apart by a distance comparable with the thickness of the lower longitudinal edge 54b of the panel 50 to which the spring features 76 are fitted. The lower longitudinal edge 54b of the panel 50 is received in the recess 88 defined between the first and second sides 84 of the bracket 78, as shown best in FIGS. 6a-6d. The spring features 76 are configured such that they can be conveniently pushed onto the longitudinal edges 54a, 54b of the panel 50 without adhesive being required to retain the spring features 76 on the longitudinal edges 54a, 54b. Such a fit between the spring features 76 and the longitudinal edges 54a, 54b is referred to herein as a 'push fit'.

In order for the spring feature 76 to form a push fit with the longitudinal edge 54b of the panel 50, the recess 88 of the bracket 78 may have a width that is slightly less than the width of the longitudinal edge 54b of the panel 50, in which case the spring feature 76 forms an interference fit or friction fit with the panel 50. Alternatively, the recess 88 may have a width that is substantially the same as, or slightly greater than, the thickness of the longitudinal edge 54b of the panel 50. In such cases, the spring feature 76 forms a close fit or loose fit with the longitudinal edge 54b of the panel 50. Both cases are examples of 'push fits' within the present definition of this term.

The function of the spring features 76 will now be explained with reference to FIGS. 6a-6d, which show a series of schematic cross-sections through a shear web 46 according to the present invention positioned between upper and lower half shells 42, 40 of a wind turbine blade 30. For ease of illustration, only portions of the half shells 42, 40 are shown and a central portion of the web panel 50 of the shear web 46 is omitted from these figures.

Referring first to FIG. 6a, an upper spring feature 76a is fitted to the upper longitudinal edge 54a of the web panel 50 and a lower spring feature 76b is fitted to the lower longitudinal edge 54b of the panel 50. In practice, a plurality of spring features 76 are fitted to both the upper and lower longitudinal edges 54a, 54b. Adhesive 96 is deposited in the slots 64 of the respective upper and lower web heads 52a, 52b. A strip of adhesive 98 is also applied to the inner surface 48 of the lower half shell 40. The lower web head 52b is positioned on the strip of adhesive 98, such that the adhesive 98 is between the flange 56b of the lower web head 52b and the inner surface 48 of the lower half shell 40.

The lower longitudinal edge 54b of the panel 50, including the attached spring features 76b is then inserted through the mouth 68 of the slot 64 in the lower web head 52b. The spring features 76b on the lower longitudinal edge 54b extend partially into the adhesive 96 deposited in the slot 64. The adhesive 96 redistributes in the slot 64 to fill the open-ended channel 92 extending through the spring feature 76b.

The upper web head 52a is then positioned over the upper longitudinal edge 54a of the web panel 50, such that the upper longitudinal edge 54a including the attached upper spring features 76a is inserted through the mouth 68 of said slot 64. The spring features 76a on the upper longitudinal edge 54a extend partially into the adhesive 96 deposited in the slot 64. The adhesive 96 redistributes in the slot 64 to fill the open-ended channel 92 extending through the spring feature 76a.

Further adhesive 100 is applied to an upper surface 102 of the flange 56a of the upper web head 52a. The upper half shell 42 is then arranged in position over the lower half shell 40 in preparation for bonding the respective half shells 40, 42 together.

As described by way of background, the respective half shells 40, 42 are typically supported in their respective mould halves of a blade mould assembly. The process of bonding the half shells 40, 42 together typically involves applying adhesive along the leading and trailing edges of one or both half shells 40,42 and lifting and turning one of the mould halves and positioning it on top of the other mould half. This is referred to as 'closing the mould'.

FIGS. 6b-6d show the upper half shell 42 positioned on top of the lower half shell 40 and being slowly lowered into place. For clarity, repetition of reference numerals is avoided in FIGS. 6b-6c, and reference should be made to FIG. 6a for the relevant reference numerals.

Referring to FIG. 6b, the weight of the upper half shell 42 begins to bear down on the shear web 46. This forces the upper and lower longitudinal edges 54a, 54b of the panel 50, including the attached spring features 76a, 76b, deeper into the slots 64 in the respective upper and lower web heads 52a, 52b. The springs 80 of the spring features 76a, 76b are forced into contact with the bases 70 of the respective slots 64. The adhesive 96 in the slots 64 now completely fills the open-ended channels 92 through the springs 80 and is squeezed towards the mouths 68 of the respective slots 64. The adhesive 98, 100 between the flanges 56a, 56b of the web heads 52a, 52b and the respective half shells 42, 40 is also partially squeezed.

Referring to FIG. 6c, the upper half shell 42 is lowered further onto the lower half shell 40. This forces the longitudinal edge regions 74 of the panel 50 further into the slots 64 in the web heads 52a, 52b and causes the springs 80 to be compressed, such that the springs 80 develop an oval shape in cross-section. The adhesive 96 in the slots 64 is squeezed further towards the mouths 68 of the respective slots 64 to almost completely fill the slots 64. The adhesive 98, 100 between the flanges 56b, 56a of the web heads 52b, 52a and the respective half shells 40, 42 is also squeezed further. With the springs 80 compressed, the springs 80 begin to develop a reactive force against the blade shells 40, 42.

Referring to FIG. 6d, this shows the upper half shell 42 lowered completely onto the lower half shell 40. The springs 80 are now further compressed and exert a considerable reactive force against the respective half shells 40, 42 as they attempt to expand again to regain a more circular cross-section. This reactive force exerted by the compressed springs 80 results in a continuous and steady compressive force being applied to the adhesive 98, 100 between the flanges 56b, 56a of the web heads 52b, 52a and the respective half shells 40, 42. Accordingly, this adhesive 98, 100 is further compressed, resulting in improved bond lines between the shear webs 46 and the half shells 40, 42.

It will be appreciated that, in addition to facilitating compression of the spring features 76a, 76b, the open-ended channels 92 extending longitudinally through the spring features 76a, 76b advantageously allow adhesive 96 to redistribute longitudinally in the slots 64 when the panel 50 is inserted.

Figure 1:
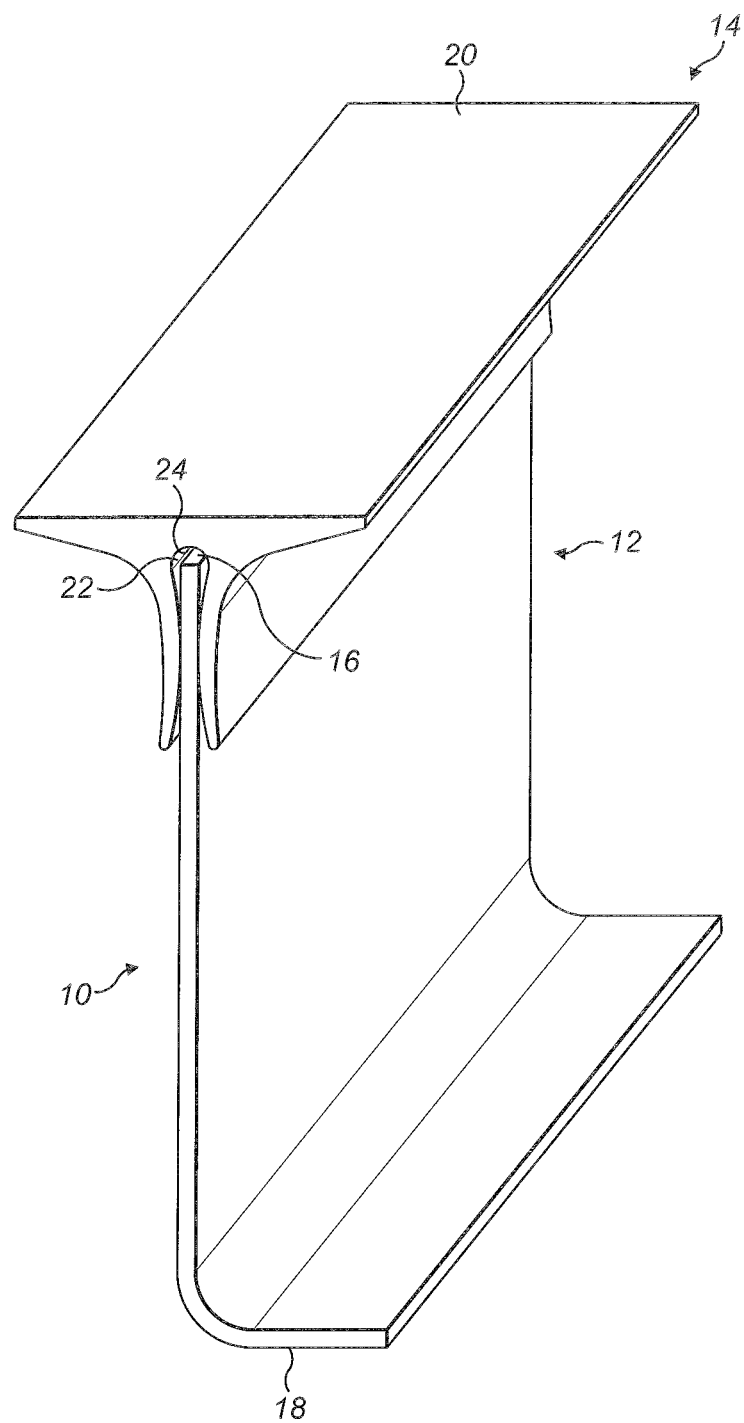
FIG. 1 has already been described above by way of background and shows a prior art shear web as described in WO2008/104174.

As the spring features 76a, 76b are relatively small discrete features attached at intervals along the longitudinal edges 54a, 54b of the panel 50, the majority of the longitudinal edges 54a, 54b of the panel 50 remain available for bonding to the bases 70 of the slots 64 in the web heads 52a, 52b. Accordingly, the longitudinal edges 54a, 54b of the panels 50 are advantageously bonded to the bases 70 of the slots 64 in the respective web heads 52a, 52b along the majority of the length of the panel 50. Adhesive voids between the panel 50 and the web heads 52a, 52b are thereby substantially avoided in this critical region. This is in contrast to the prior art shown in FIG. 1, where the strip of foam 24 occupied the base of the slot 22 along the entire length of web head 20 and prevented the longitudinal edges 22 of the panel 12 from bonding to the base of the slots 22.

As will now be discussed, the spring features 76a, 76b also advantageously function as spacing features to ensure that the panel 50 is spaced apart from both sidewalls 65 of the slots in the web heads. This allows space for adhesive to accumulate and ensures that the panel is bonded on both sides to the web head to form a double lap joint with the web head.

It is clear from FIG. 6a, for example, that the longitudinal edge regions 74 of the panel 50, which are received in the slots 64 of the web heads 52a, 52b, have a thickness significantly less than the width of the slots 64. The spring features 76a, 76b are wider in cross-section than the longitudinal edge regions 74 of the panel 50 and thus protrude beyond the first and second sides 72a, 72b of the panel 50. The spring features are comparable in width to the width of the base 70 (FIG. 6b) of the slots 64 such that the spring features 76a 76b abut the first and second sidewalls 65 of the slot 64 when the longitudinal edges 54a, 54b of the panel 50 are forced towards the bases 70 of the slots 64. Accordingly, the spring features 76a, 76b thereby ensure that the panel 50 is spaced apart from both the first and second sidewalls 65 of the respective slots 64. This ensures that gaps 104 (see FIG. 6d) are defined between the panel 50 and both of the sidewalls 65 of the respective slots 64 for adhesive 96 to redistribute into when the panel 50 is inserted into the slots 64.

In an example, the spring features 76a, 76b are configured to centre the panel 50 in the respective slots 64. This is achieved by the spring features 76a, 76b protruding by substantially equal amounts beyond both sides 72a, 72b of the panel 50. With the panel 50 central inside the slot 64, spaces 104 of equal size are defined between the panel 50 and the respective sidewalls 65 of the slots 64 in the web heads 52a, 52b. The adhesive 96 in the slots 64 redistributes to fill these spaces 104 when the panel 50 is inserted into the slots 64. The spring features 76a, 76b therefore ensure that the adhesive 96 is distributed evenly on both sides 72a, 72b of the panel 50 in the slot 64 and thus ensures that the panel 50 is bonded on both sides 72a, 72b to the respective sidewalls 65 of the slot 64 to form a double lap joint with each web heads 52a, 52b.

FIGS. 7a-7c show a variety of alternative configurations for the spring features 76.

Referring to FIG. 7a this shows a spring feature 76c similar to the spring features 76 described above, but in which a portion 106 of the spring 80c is folded inwardly. This allows the spring 80c to compress additionally in a direction parallel to the width of the slot 64 when inserted in the web head 52a, 52b. The spring 80c may be formed wider than the slot 64 and compress inwardly slightly when inserted into the slot 64. This allows the spring to accommodate slots 64 of varying width e.g. to accommodate a tolerance in the slot width.

FIGS. 7b and 7c are cross-sectional views of further variants of the spring features. The spring feature 76d shown in FIG. 7b has a spring 80d that is shaped as a figure of eight in cross-section. Accordingly, two open-ended channels 92d are defined through the spring 80d. The spring feature 76e shown in FIG. 7c comprises a spring 80e having an S-shaped cross-section, and also defines two-open ended channels 92e. Other suitable shapes of the spring features will be readily apparent to persons skilled in the art.

Whilst the spring features in the above embodiments each protrude beyond both sides 72a, 72b of the panel 50, and thus space the panel 50 apart from both sides of the slot 64, in other embodiments one or more spring features may be configured to protrude beyond only one side of the panel 50. In such embodiments, one or more spring features may be arranged on a longitudinal edge 54a, 54b of the panel 50 such that they protrude beyond only a first side 72a of the panel 50, and one or more spring features may be arranged on the longitudinal edge 54a, 54b such that they protrude beyond only a second side 72b of the panel 50. This would still result in the panel 50 being suitably spaced from both sides of the slot 64, but would only require a spring feature to protrude from one side 72a or 72b of the panel 50.

As discussed briefly below, many other modifications may be made to the above examples without departing from the scope of the present invention as defined in the accompanying claims.

Whilst the spring features 76 form a push fit in the above examples, in other embodiments the spring features may be attached to the web panel 50 by other means. For example the spring features may be bonded or attached by mechanical fasteners such as rivets. A push fit is however preferable as it reduces the number of steps involved in the process and is thus cheaper and most efficient.

Whilst the spring features 76 in the above embodiment are arranged at two to four per metre intervals along the longitudinal edges 54a, 54b of the web panel 50, other suitable spacings could be employed. For example, the spring features 76 could be arranged at larger intervals, which would advantageously reduce the number of spring features 76 required.

Whilst in the above embodiment the shear web 46 comprises web heads 52a, 52b on both the upper and lower longitudinal edges 54a, 54b of the web panel 50, in other embodiments the shear web 46 may only comprise a web head on one of the upper or lower longitudinal edges. The other edge may comprise an integral flange, similar to the shear web shown in FIG. 1, for example.

Whilst the web heads 52a, 52b are bonded to the inner surfaces 48 of the respective windward and leeward half shells 40, 42 in the above embodiment, in other examples one or both web heads 52a, 52b may be integrated with the respective half shells 40, 42 during the manufacture of the half shell 40, 42. For example, the web head 52a, 52b may be laid up in the blade mould together with the other structural components of the blade shells 40, 42 and integrated with those other components by means of resin infusion or equivalent process.

Whilst the web heads 52a, 52b in the above example comprise a pair of legs 58 defining the sidewalls 65 of the slot 64, in other embodiments the web heads 52a, 52b may not include legs. For example, the slot 64 may be formed by a suitable recess in an otherwise solid web head. Equally, the web heads 52a, 52b may not necessarily include a flange 56 but may instead comprise any other suitable surface for bonding to the inner surfaces 48 of the half shells 40, 42.

Whilst the blade 30 in the above examples includes two shear webs 46, in other examples the blade 30 may include any number of shear webs 46. For example, a third shear web may be included near the trailing edge 38 of the blade 30 in some cases.

The invention claimed is:

1. A shear web for a wind turbine blade, the shear web comprising:
   a longitudinally-extending panel having a longitudinal edge region defining a longitudinal edge of the panel;
   a longitudinally-extending web head comprising a longitudinal surface for bonding to an inner surface of a wind turbine blade shell, and first and second longitudinally-extending sidewalls arranged transverse to the longitudinal surface, the sidewalls being mutually spaced apart to define a longitudinally-extending slot therebetween for receiving the longitudinal edge region of the panel; and
   a plurality of discrete spring features attached to the longitudinal edge of the panel, the spring features being mutually spaced apart at intervals along the length of the longitudinal edge and configured to compress against a base of the slot when the longitudinal edge region of the panel is inserted into the slot,
   wherein the spring features each comprise a bracket shaped to fit over the longitudinal edge of the panel and a spring depending from the bracket.

2. The shear web of claim 1, wherein the longitudinal edge region of the panel is received within the slot of the web head and the longitudinal edge of the panel is bonded to the base of the slot along a majority of the length of the slot.

3. The shear web of claim 1, wherein the spring is integrally formed with the bracket.

4. The shear web of claim 1, wherein the spring is substantially tubular.

5. The shear web of claim 1, wherein the spring is substantially circular in cross-section.

6. The shear web of claim 1, wherein the spring features are configured to form a push fit with the longitudinal edge of the panel.

7. The shear web of claim 1, wherein the spring features are injection moulded or extruded parts.

8. The shear web of claim 1, wherein the spring features each define one or more open-ended channels extending longitudinally substantially parallel to the longitudinal edge of the panel.

9. The shear web of claim 1, wherein the slot is wider in cross section than the longitudinal edge region of the panel and the spring features protrude beyond first and/or second sides of the longitudinal edge region, the spring features being configured to abut the first and/or second sidewalls of the slot thereby ensuring that the longitudinal edge region of the panel is spaced apart from the first and/or second sidewalls of the slot.

10. The shear web of claim 1, wherein the spring features are configured to align the longitudinal edge region of the panel substantially centrally in the slot with respect to the first and second sidewalls.

11. The shear web of claim 1, wherein the web head comprises a flange defining the longitudinal surface for bonding to the inner surface of the wind turbine blade shell, and wherein the first and second sidewalls are arranged transverse to the flange.

12. A wind turbine blade comprising the shear web of claim 1.

* * * * *

UNITED STATES PATENT AND TRADEMARK OFFICE
CERTIFICATE OF CORRECTION

PATENT NO.         : 10,697,425 B2  
APPLICATION NO.    : 15/747491  
DATED              : June 30, 2020  
INVENTOR(S)        : Anton Bech et al.

Page 1 of 1

It is certified that error appears in the above-identified patent and that said Letters Patent is hereby corrected as shown below:

On the Title Page

At Item (73), change "Svstems" to --Systems--.

Signed and Sealed this  
Fifteenth Day of September, 2020

Andrei Iancu  
*Director of the United States Patent and Trademark Office*